United States Patent
Klonowski et al.

(10) Patent No.: US 11,316,394 B2
(45) Date of Patent: Apr. 26, 2022

(54) ELECTRICAL MACHINE OF A TURBOMACHINE COMPRISING A ROTOR COOLED BY A COOLING CHANNEL

(71) Applicant: SAFRAN HELICOPTER ENGINES, Bordes (FR)

(72) Inventors: Thomas Klonowski, Moissy-Cramayel (FR); Camel Serghine, Moissy-Cramayel (FR); Jean-Luc Charles Gilbert Frealle, Moissy-Cramayel (FR); Sebastien Combebias, Moissy-Cramayel (FR); Jean-Julien Camille Vonfelt, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 220 days.

(21) Appl. No.: 16/763,723

(22) PCT Filed: Nov. 14, 2018

(86) PCT No.: PCT/FR2018/052832
§ 371 (c)(1),
(2) Date: May 13, 2020

(87) PCT Pub. No.: WO2019/097160
PCT Pub. Date: May 23, 2019

(65) Prior Publication Data
US 2021/0376677 A1   Dec. 2, 2021

(30) Foreign Application Priority Data
Nov. 14, 2017   (FR) .................................... 1760674

(51) Int. Cl.
  *H02K 1/32*    (2006.01)
  *H01F 7/02*    (2006.01)
  *B64C 27/12*   (2006.01)

(52) U.S. Cl.
  CPC ............... *H02K 1/32* (2013.01); *H01F 7/021* (2013.01); *B64C 27/12* (2013.01)

(58) Field of Classification Search
  CPC ........ H02K 1/32; H02K 9/04; H02K 2209/00; H02K 9/02; H02K 1/20; H01F 7/021; H01F 27/10; B64C 27/12
  See application file for complete search history.

(56) References Cited

U.S. PATENT DOCUMENTS 11,230,375 B1 *   1/2022   Hoffberg ............... B64C 39/001
11,232,893 B2 *   1/2022   Takagi ................... H02K 21/16
(Continued)

FOREIGN PATENT DOCUMENTS

DE   10 2008 020 426 A1   10/2009
EP       0952657 A2 *   10/1999
(Continued)

OTHER PUBLICATIONS

Communication dated Jul. 23, 2018 from French Patent Office in FR Application No. 1760674.
(Continued)

*Primary Examiner* — Mohamad A Musleh
(74) *Attorney, Agent, or Firm* — Sughrue Mion, PLLC

(57) ABSTRACT

The invention relates to an electrical machine comprising a stator (1) and a rotor (2) designed to be rotated in relation to each other, said rotor (2) or said stator comprising a plurality of permanent magnets (5), at least one permanent magnet comprising at least one fluid-propagation channel (10) extending longitudinally inside the permanent magnet, the propagation channel comprising a fluid inlet and a fluid
(Continued)

outlet, the fluid inlet being bell-mouthed and oriented in a preferential direction of rotation of the permanent magnet.

9 Claims, 3 Drawing Sheets

(56) References Cited

U.S. PATENT DOCUMENTS

| | | |
|---|---|---|
| 2002/0009362 A1 | 6/2002 | Jakoby et al. |
| 2004/0155537 A1 | 8/2004 | Nakano et al. |
| 2019/0296614 A1* | 9/2019 | Tang ..................... H02K 9/193 |
| 2020/0036248 A1* | 1/2020 | Krais .................... H02K 21/14 |

FOREIGN PATENT DOCUMENTS

| | | | |
|---|---|---|---|
| EP | 1953896 A1 * | 8/2008 | ........... H02K 1/2766 |
| EP | 2 779 366 A2 | 9/2014 | |
| FR | 2875965 A1 | 3/2006 | |
| JP | 2008-312292 A | 12/2008 | |
| JP | 2011-254577 A | 12/2011 | |
| WO | WO-2015150545 A1 * | 10/2015 | ............... H02K 1/02 |

OTHER PUBLICATIONS

Jacim Jacimovic et al., "Net Shape 3D Printed NdFeB Permanent Magnet", Advanced Engineering Materials, Apr. 21, 2017, 9 pages, vol. 19, No. 8.

International Search Report for PCT/FR2018/052832 dated Mar. 4, 2019 [PCT/ISA/210].

\* cited by examiner

ELECTRICAL MACHINE OF A TURBOMACHINE COMPRISING A ROTOR COOLED BY A COOLING CHANNEL

GENERAL TECHNICAL FIELD

The invention relates to engines of aircraft, in particular those of a helicopter. It particularly relates to electrical machines installed on helicopter engines performing the function of electrical power generation, and/or electrical motorization of certain mechanical members. These electrical machines can be starter-generators, alternators or electrical pumps which are direct-current or alternating-current machines.

STATE OF THE ART

An engine of an aircraft comprises electrical machines comprising a rotor (turning part) and a stator (fixed part). The stator comprises a magnetic circuit and an electrical circuit formed by a set of coils composed of conductive wires.

In a known manner, such electrical machines have transient phases of operations mainly encountered during sequences of starting or acceleration of the engine of the aircraft or of certain items of equipment that the engine of the aircraft comprises.

During these transient phases, the electrical machine, thus heavily used, dissipates a quantity of heat which can turn out to be damaging to itself, heat mainly dissipated into the electrical circuits and/or on the permanent magnets if the machine comprises any.

In a known manner, to promote the dissipation of the heat and thus guarantee the integrity of the electrical machine, the elements that compose it are oversized which penalizes its weight and bulk.

Specifically, the structure and sizing of an electrical machine are guided by its thermal withstand and this is mainly a function of the amplitude of the electrical currents it bears within these conductive coils (for example, an electrical machine operating on a mains voltage of 28 Vdc, on a power of several kW or kVA will give electrical currents of high amperage which can reach several hundreds of amperes).

In order to optimize the heat dissipation of the electrical machine, several solutions are already known and employed.

A first solution uses natural convection with cooling by finned dissipator on the periphery of the electrical machine to have a considerable exchange surface with the surrounding medium. However, this solution is bulky and weighty and often requires a stream of air on the periphery of the machine.

A second solution uses convection forced by the addition of a fan connected to the rotor shaft of the electrical machine, of which the stream of air thus produced will exchange with the external and/or internal parts of the machine. However, this solution is bulky and can generate additional sources of faults.

A third other solution uses forced cooling by injecting a liquid circulating in dedicated channels inside the electrical machine or on the periphery (water, oil, fuel etc.) and usually requires the presence of an additional exchanger to provide the cooling of this liquid. However, this solution is also bulky, weighty and intrusive, and requires fairly short maintenance intervals (i.e. management of the sealing).

A fourth solution uses cooling by thermoelectric module (Peltier effect). However, with this solution the cooling is performed only on localized areas and also requires a stabilized supply allowing the thermoelectric supply.

Thus, in an aeronautical application, that is to say in the context of an onboard system requiring heavy restrictions in terms of compactness, weight and reliability, the existing solutions are not satisfactory.

PRESENTATION OF THE INVENTION

The invention makes it possible to control the temperature of the permanent magnets to an acceptable level, which will guarantee the stability of their magnetic properties in all operating cases, permanent or transient.

For this purpose, the invention proposes an electrical machine comprising a stator and a rotor to be rotationally driven with respect to one another, said rotor or said stator comprising a plurality of permanent magnets, and is characterized in that at least one permanent magnet comprises at least one channel of propagation of a fluid extending longitudinally inside the permanent magnet.

The electrical machine defined above can further have, advantageously and without limitation, the following features taken alone or in any of their technically possible combinations:
- the channel has a profile configured so that a fluid propagating inside the channel has a turbulent flow;
- the channel is defined along a longitudinal axis having a non-zero angle with respect to the axis of rotation of said electrical machine, typically an angle of inclination between 1 and 10 degrees, typically 5 degrees;
- the channel of propagation comprises a fluid inlet and a fluid outlet, the fluid inlet being bell-mouthed in the opposite direction to the circulation of the fluid;
- the channel is of straight shape or of corrugated shape or of spiral shape;
- the permanent magnet and said at least one channel are obtained according to an additive manufacturing process;
- each magnet has channels with identical or different shapes.

The invention also relates to a direct-current or alternating-current machine such as a starter-generator, an alternator, a pump comprising an electrical machine according to the invention as well as an engine of an aircraft, such as a helicopter, comprising a starter-generator according to the invention.

Thus, the invention basically consists in incorporating cooling galleries allowing optimal heat management into the permanent magnets themselves.

The advantages of the invention are several.

The invention makes it possible to improve the electromagnetic performance of the electrical machine and therefore the obtainment of an increased mechanical torque available on the rotor by the maintaining of the magnetic induction characteristics of the permanent magnets over a wider temperature range.

The invention makes it possible to reduce the overall weight of an engine of an aircraft by reducing the weight of the electrical machine since there is the additional possibility of increasing the acceptable current density at the coils of the stator, thus the effect due to the magnetic field thus generated, perceived by the permanent magnets as a demagnetization field (i.e. coercive field) is greatly reduced by the control of their temperatures.

Furthermore, there is no addition of additional systems (i.e. exchanger, fins etc.) penalizing the mass balance, the bulk and the reliability of the electrical machine.

PRESENTATION OF THE FIGURES

Other features, aims and advantages of the invention will become apparent from the following description, which is purely illustrative and non-limiting, and which must be read with reference to the appended drawings wherein.

In all the figures similar elements bear identical reference numbers.

DETAILED DESCRIPTION OF THE INVENTION

Figure 1:
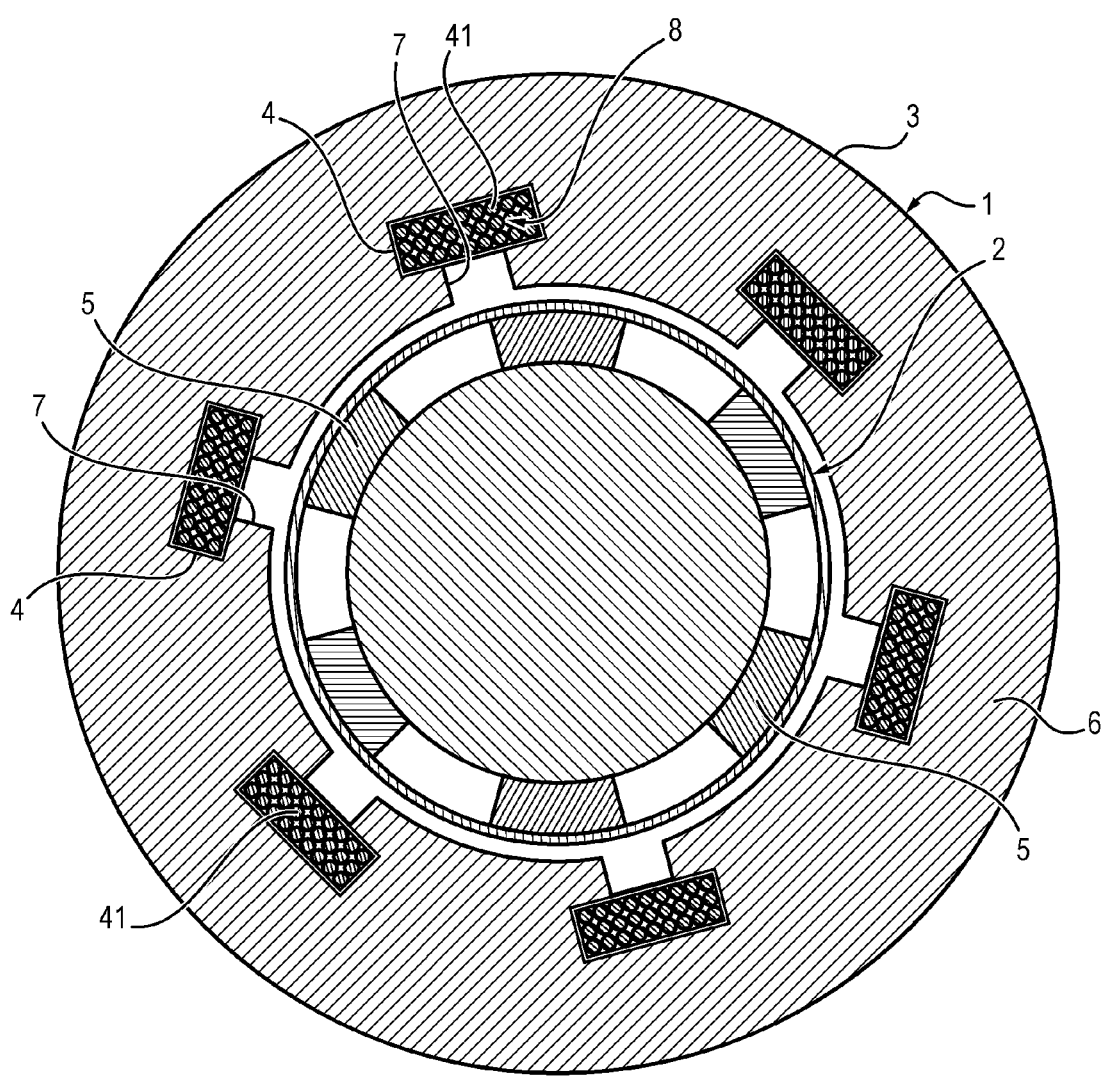
FIG. 1 illustrates a view of an electrical machine according to the invention.

In FIG. 1 is illustrated an electrical machine according to an embodiment of the invention. Such an electrical machine is particularly used in an engine of an aircraft.

The electrical machine of FIG. 1 is a machine with permanent magnets and comprises a stator 1 and a rotor 2 (the stator and the rotor of this figure can be reversed).

The stator 1 comprises a magnetic circuit 3. The magnetic circuit 3 comprises a peripheral portion 6 of generally cylindrical shape and poles 7 extending toward the rotor 2 and the stator 1 comprises an electrical circuit 4 formed by a coil of several conductive elements 41 around each pole 7 of the magnetic circuit 3. In this figure, the conductive elements 41 are of cylindrical cross-section but other cross-sections can be envisioned.

The rotor 2 supports permanent magnets 5. In FIG. 1, the electrical machine comprises six permanent magnets 5 but a different number can be envisioned.

This type of electrical machine topology makes it possible to operate either in generator mode (i.e. the rotor 2 turns owing to the application of an external mechanical torque and the variation in magnetic flux in the electrical circuit 4 induces an electrical current) or in motor mode (i.e. the supply of power to the electrical circuit 4 gives rise to a magnetic flux through the magnetic circuit 3 and the interaction with the magnetic flux coming from the magnets 5 gives rise to the rotation of the rotor 2, and therefore an outward mechanical torque.).

Figure 2:
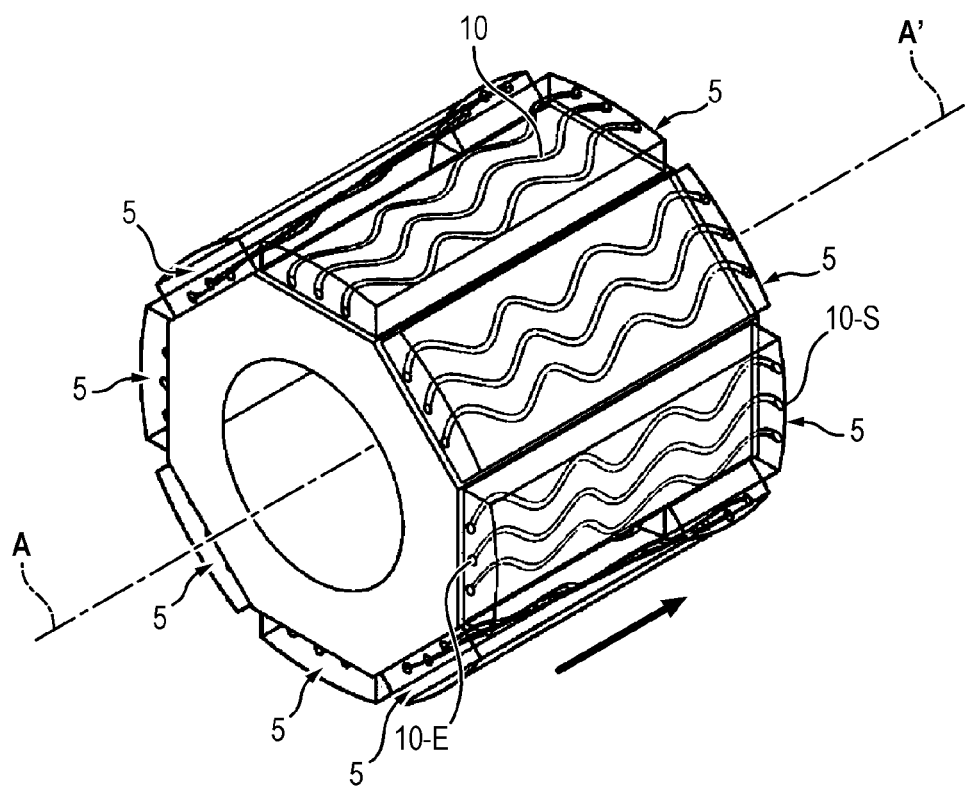
FIG. 2 illustrates a rotor of an electrical machine according to the invention.

In relation with FIG. 2 which illustrates a rotor of an electrical machine, in order to promote the dissipation of the heat of the electrical machine particularly during the transient phases shown previously, each permanent magnet 5 comprises channels allowing the circulation of a fluid.

In the configuration of permanent magnets in rotation, attached onto the rotor of the electrical machine, this fluid will be mainly air containing or not containing oil vapor.

In the case of fixed permanent magnets positioned at the stator of the electrical machine, this fluid may be gaseous as described previously or any other neutral gas compatible with an electrical circuit (Argon, Nitrogen, etc.) or liquid (water, oil, fuel, etc.).

The fluid can be transported to the vicinity of the channel supply area in different ways which will not be described here.

Each channel 10 extends longitudinally inside the permanent magnet along a direction parallel to the axis of rotation AA' of the rotor. Such an orientation makes it possible to make the fluid circulate from a fluid inlet 10-E toward a fluid outlet 10-S of the channel 10 in a direction of circulation of the fluid (solid arrow in FIG. 2).

In the case of permanent magnets in rotation, it is the rotation of the rotor 2 which makes it possible to make the fluid circulate in the channels 10.

In the case of fixed permanent magnets the supply of fluid can be forced by an appended system not described here (i.e. fan for gas, pump for a liquid). This latter example will concern only the configuration with fixed permanent magnets at the stator.

According to the case, provision can be made for the electrical machine to be so-called "closed", that is to say that it is sealed vis-à-vis the external environment or so-called "open" with the possible circulation, forced or otherwise, of the surrounding air within the machine itself.

Figure 3:
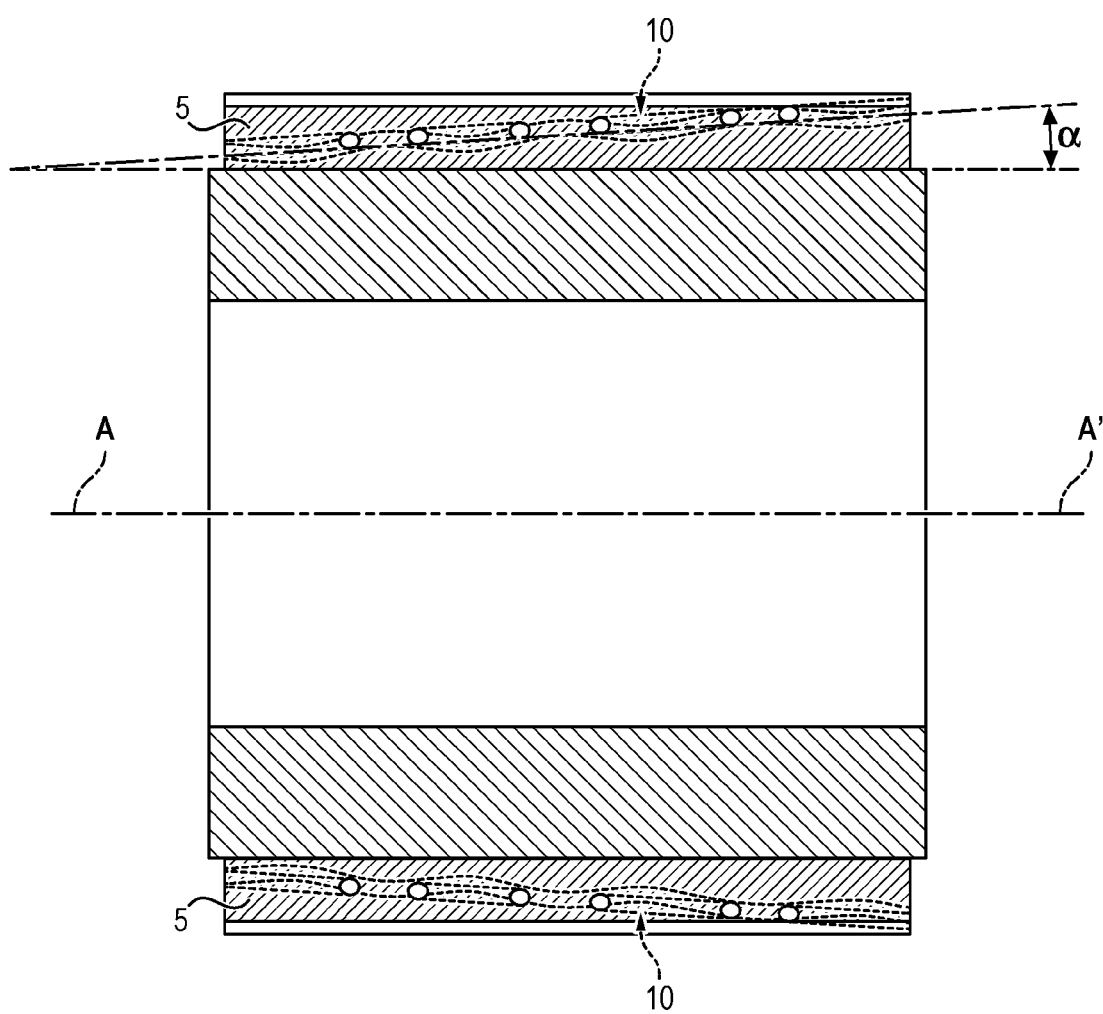
FIG. 3 illustrates a section view of FIG. 2.

To improve the circulation of the fluid and as illustrated in FIG. 3, the channels are not parallel to the axis AA' of rotation of the rotor but have an inclination a which is non-zero with respect to this axis. Thus, such an inclination makes it possible to create a phenomenon of suction of the fluid having a direction from the point located on the lowest radius and going toward the point located on the highest radius.

Furthermore, the angle of inclination of the channels (between 1 and 10 degrees, typically 5 degrees) is a parameter which makes it possible to obtain a good flow rate/length/surface area trade-off in order to optimize heat exchanges while reducing pressure losses undergone by the coolant inside the channels.

In order to minimize inlet losses (i.e. at the level of the supply to the channel or channels) and maximize the sensed flow rate, the fluid inlet 10-E can be bell-mouthed (i.e. Pitot type) and oriented in the direction of rotation of the rotor 2 to benefit from the dynamic pressure. In order to create a slight depression at the outlet, promoting the flow rate of internal circulation, the outlet 10-S will meanwhile be oriented in the opposite direction to that of the rotation of the rotor 2.

In order to adapt to all the configurations encountered, in terms of static pressure level at the inlet and outlet of the cooling channel, the variation in cross-section of the channel, along the flow, can be constant, divergent (i.e. so-called "diffusive") or convergent.

For the heat exchange to be efficient it is necessary that the exchange surface between the channels and the magnet be as large as possible, and it is necessary to ensure an internal turbulent flow regime (i.e. characterized by the Reynolds number as a function of the fluid used).

Provision is made for at least one magnet to comprise at least one channel. However, the number of channels depends on the size of the magnet but as a function of the nominal magnetic induction desired for the magnets this number is optimized to, on the one hand, increase the efficiency of the cooling and, on the other hand, to reduce the manufacturing cost of the magnet.

In FIG. 2, the shape of the channel is corrugated but other shapes can be envisioned: straight, spiral etc.

In a complementary manner, the internal surface of the channels can be smooth or rough with a roughness that can be up to several tens of μm. The choice of the rough surface makes it possible to promote heat exchanges by the obtainment of said turbulent flow regime but leads to a reduction of the fluid flow rate inside the channels.

The size of the channels is an important parameter as regards the correct cooling of the magnet. Also, their size will be on the millimeter scale to allow a correct flow of the fluid locally in the areas of interest in the core of the magnet without aggravating the pressure losses.

By way of example by having inclined channels with an electrical machine turning at very fast speeds (>30000 rpm) this creates a circulation of the coolant inside the channels, in this case here, which can attain considerable speeds close to 50-100 m/s with mass flow rates of approximately 0.1-0.2 g/s.

In a complementary manner, to avoid excessively high pressure losses generated by overly long cooling channels, which would penalize the acceptable flow rates, in the case of rotors of significant length (>100 mm) a preferred solution is to split the magnet along its longitudinal axis, which in particular has the advantage of reducing eddy current losses, a source of heat, circulating in the magnet.

Preferably, magnets with rough or smooth channels are manufactured by an additive manufacturing process. Specifically, so-called "hard" permanent magnets are by their nature fragile such that it is not possible to envision drilling into them or even machining them.

Such a process is of SLM (Selective Laser Melting) type, EBM (Electro Beam Melting) type or PIM (Powder Injection Molding) type, the principle of which is to melt by a laser (SLM) or electron beam (EBM) successive layers of magnet powder. These two processes make it possible to have a magnetic matrix with the property of very good mechanical withstand which is an essential aspect given the very high speeds of rotation at which the rotors turn.

Furthermore, to optimize the manufacturing cost of the magnets the number of channels is increased to reduce the quantity of powder used and reduce the manufacturing time.

In a complementary manner, in addition to having cooling channels inside the magnets, it is possible to arrange heat dissipators at other places of the electrical machine as described in document FR 3 012 698 in the name of the Applicant.

We have described here an electrical machine with a stator coil and permanent magnets at the rotor. Of course, the invention is also applicable to an electrical machine with a rotor coil and permanent magnets at the stator, as formed for example by the so-called continuous direct-current electrical machine wherein the inductive magnetic flux generated by the magnets is fixed with respect to the stator (i.e. so-called "claw pole" motor vehicle alternator).

The invention also relates to a direct-current or alternating-current machine such as a starter-generator, an alternator, or a pump comprising an electrical machine as described above.

And the invention also relates to an engine of an aircraft, such as a helicopter, comprising an electrical machine according to the invention.

The invention claimed is:

1. An electrical machine comprising a stator (1) and a rotor (2) configured to be rotationally driven with respect to one another, said rotor (2) or said stator comprising a plurality of permanent magnets (5), the machine being characterized in that at least one permanent magnet comprises at least one channel (10) of propagation of a fluid extending longitudinally inside the permanent magnet,
the propagation channel comprising a fluid inlet and a fluid outlet, the fluid inlet being bell-mouthed and oriented in a preferred direction of rotation of the permanent magnet.

2. The electrical machine as claimed in claim 1, wherein the propagation channel has a profile configured so that a fluid propagating inside the channel has a turbulent flow.

3. The electrical machine as claimed in claim 1, wherein the propagation channel is defined along a longitudinal axis having a non-zero angle with respect to the axis of rotation of said electrical machine, typically an angle of inclination between 1 and 10 degrees, typically 5 degrees.

4. The electrical machine as claimed in claim 1, wherein a permanent magnet is split along a longitudinal axis of said magnet, to limit pressure losses at the level of a propagation channel of said permanent magnet.

5. The electrical machine as claimed in claim 1, wherein the propagation channel is of straight shape or of corrugated shape or of spiral shape.

6. The electrical machine as claimed in claim 1, wherein the permanent magnet and said at least one channel (10) are obtained according to an additive manufacturing process.

7. The electrical machine as claimed in claim 1, wherein each magnet (5) has channels with identical or different shapes.

8. A direct-current or alternating-current machine such as a starter-generator, an alternator, or a pump comprising an electrical machine as claimed in claim 1.

9. An engine of an aircraft, such as a helicopter, comprising a starter-generator as claimed in claim 8.

* * * * *